United States Patent
Brannon et al.

(10) Patent No.: US 12,196,712 B2
(45) Date of Patent: Jan. 14, 2025

(54) DETAILED SONIC FATIGUE ANALYSIS

(71) Applicant: The Boeing Company, Chicago, IL (US)

(72) Inventors: Michael Shawn Brannon, Summerville, SC (US); Mark Anthony Gasper, Seal Beach, CA (US)

(73) Assignee: The Boeing Company, Chicago, IL (US)

( * ) Notice: Subject to any disclaimer, the term of this patent is extended or adjusted under 35 U.S.C. 154(b) by 269 days.

(21) Appl. No.: 17/937,549

(22) Filed: Oct. 3, 2022

(65) Prior Publication Data

US 2024/0110894 A1    Apr. 4, 2024

(51) Int. Cl.
*G01N 29/04* (2006.01)
*G06F 30/13* (2020.01)
*G06F 30/23* (2020.01)

(52) U.S. Cl.
CPC .......... *G01N 29/043* (2013.01); *G06F 30/13* (2020.01); *G06F 30/23* (2020.01)

(58) Field of Classification Search
CPC ....... G01N 29/043; G06F 30/13; G06F 30/23; G06F 30/15; G06F 2119/04; G06F 2119/10; G06F 2119/14; G06F 30/17; G06F 2111/04; G06F 2113/28; G06T 17/20
See application file for complete search history.

(56) References Cited

U.S. PATENT DOCUMENTS

| | | | |
|---|---|---|---|
| 4,089,224 A | 5/1978 | Scott et al. | |
| 6,813,749 B2 | 11/2004 | Rassaian | |
| 6,862,539 B2 | 3/2005 | Fields et al. | |
| 7,880,737 B2 | 2/2011 | Elchuri | |
| 8,214,188 B2 * | 7/2012 | Bailey | E21B 7/00 |
| | | | 702/6 |
| 9,449,123 B2 | 9/2016 | Mu | |
| 10,801,998 B2 | 10/2020 | Giurgiutiu et al. | |
| 2003/0154451 A1 | 8/2003 | Rassaian | |

(Continued)

FOREIGN PATENT DOCUMENTS

EP    2500836 A2    9/2012

OTHER PUBLICATIONS

European Patent Office Extended Search Report, dated Feb. 15, 2024, regarding Application No. EP23198135.8, 12 pages.

(Continued)

*Primary Examiner* — Francis C Gray
(74) *Attorney, Agent, or Firm* — Yee & Associates, P.C.

(57) ABSTRACT

Sonic fatigue analysis is provided. The method comprises developing a finite element model of a structure and calculating, from the finite element model, a number of eigenvalues representing fundamental frequencies and mode shapes for the structure. The eigenvalues are mapped to pressure loads applied to the structure in the finite element model. Frequency responses from the pressure loads are analyzed according to pressure spectral density requirements for the structure, and a critical element in the structure is identified according to the frequency responses. A frequency response function is plotted for the critical element, and an applied stress is calculated according to the frequency response function, wherein the applied stress represents total cumulative stress at the critical element.

21 Claims, 16 Drawing Sheets

(56) References Cited

U.S. PATENT DOCUMENTS

| | | | |
|---|---|---|---|
| 2006/0217943 A1* | 9/2006 | Rassaian | G06F 30/23 |
| | | | 703/2 |
| 2012/0166152 A1* | 6/2012 | Bathe | G16B 15/10 |
| | | | 703/2 |
| 2012/0239358 A1* | 9/2012 | Yiu | G06F 30/23 |
| | | | 703/2 |
| 2015/0122547 A1* | 5/2015 | Hohl | E21B 44/02 |
| | | | 175/40 |
| 2016/0125107 A1* | 5/2016 | Druckman | G06F 30/23 |
| | | | 703/2 |

OTHER PUBLICATIONS

Przekop Adam et al: "A Nonlinear Reduced Order Method for Prediction of Acoustic Fatigue", Jan. 1, 2006 (Jan. 1, 2006), XP093126844, Langley Research Center, Retrieved from the Internet: URL:https://ntrs.nasa.gov/api/citations/20080014261/downloads/ 20080014261.pdf [retrieved on Feb. 2, 2024].

Rizzi Stephen A et al: "Estimation of sonic fatigue by reduced-order finite element based analyses", Star, vol. 44, Aug. 29, 2006, XP093126762, US ISSN: 1548-8837, Retrieved from the Internet: URL:https://ntrs.nasa.gov/api/citations/20060026030/downloads/20060026030.pdf.

\* cited by examiner

DETAILED SONIC FATIGUE ANALYSIS

BACKGROUND INFORMATION

1. Field

The present disclosure relates generally to structural analysis, and more specifically to analysis of acoustic pressure applied to a structure according to its modes of vibration.

2. Background

In engineering, a mode is a standing wave of excitation with a characteristic shape that a structure will vibrate in when excited. Each mode has a respective frequency at which they oscillate.

Panels such as those on jet aircraft can be exposed to acoustic loads by high power engine noise and jet flow noise, which can cause sonic fatigue damage. Sonic fatigue analysis is often used in the design and structural evaluations of hardware. Sonic fatigue analysis can be labor intensive when accounting for all higher order modes, which can contribute to sonic fatigue damage.

Therefore, it would be desirable to have an alternative analysis method and apparatus that take into account at least some of the issues discussed above, as well as other possible issues.

SUMMARY

An illustrative embodiment provides a computer-implement method for sonic fatigue analysis. The method comprises developing a finite element model of a structure and calculating, from the finite element model, a number of eigenvalues representing fundamental frequencies and mode shapes for the structure. The eigenvalues are mapped to pressure loads applied to the structure in the finite element model. Frequency responses from the pressure loads are analyzed according to pressure spectral density requirements for the structure, and a critical element in the structure is identified according to the frequency responses. A frequency response function is plotted for the critical element, and an applied stress is calculated according to the frequency response function, wherein the applied stress represents total cumulative stress at the critical element.

Another illustrative embodiment provides a system for sonic fatigue analysis. The system comprises a storage device configured to store program instructions and one or more processors operably connected to the storage device and configured to execute the program instructions to cause the system to: develop a finite element model of a structure; calculate, from the finite element model, a number of eigenvalues representing fundamental frequencies and mode shapes for the structure; map the eigenvalues to pressure loads applied to the structure in the finite element model; analyze frequency responses from the pressure loads according to pressure spectral density requirements for the structure; identify a critical element in the structure according to the frequency responses; plot a frequency response function for the critical element; and calculate an applied stress according to the frequency response function, wherein the applied stress represents total cumulative stress at the critical element.

Another illustrative embodiment provides a computer program product for sonic fatigue analysis. The computer program product comprises a computer-readable storage medium having program instructions embodied thereon to perform the steps of: developing a finite element model of a structure; calculating, from the finite element model, a number of eigenvalues representing fundamental frequencies and mode shapes for the structure; mapping the eigenvalues to pressure loads applied to the structure in the finite element model; analyzing frequency responses from the pressure loads according to pressure spectral density requirements for the structure; identifying a critical element in the structure according to the frequency responses; plotting a frequency response function for the critical element; and calculating an applied stress according to the frequency response function, wherein the applied stress represents total cumulative stress at the critical element.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations as described herein. For example, the illustrative embodiments recognize and take into account that a mode is a standing wave of excitation with a characteristic shape that a structure will vibrate in when excited. Each mode has a respective frequency at which they oscillate. The illustrative embodiments recognize and take into account that higher order modes can contribute to sonic fatigue damage.

The illustrative embodiments also recognize and take into account that structural analysts often ignore the effects of higher order modes due to difficulties with quantification. Current hand analysis methods are limited in scope regarding where they can be applied. For example, oftentimes aircraft structures do not fit within the scope of classical hand methods. For example, developing pressure load distributions inside an engine can be complicated and time intensive.

The illustrative embodiments provide a method of sonic fatigue analysis that utilizes the structural response of a panel in order to create a more accurate analysis by incorporating higher order modal responses that a detailed structural analysis captures, that are typically missed by current hand methods. By assuming a worst case scenario, the illustrative embodiments eliminate the need to develop pressure load distributions inside structures.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, "a number of" when used with reference to items, means one or more items. For example, "a number of different types of networks" is one or more different types of networks. In illustrative example, a "set of" as used with reference items means one or more items. For example, a set of metrics is one or more of the metrics.

Figure 1:
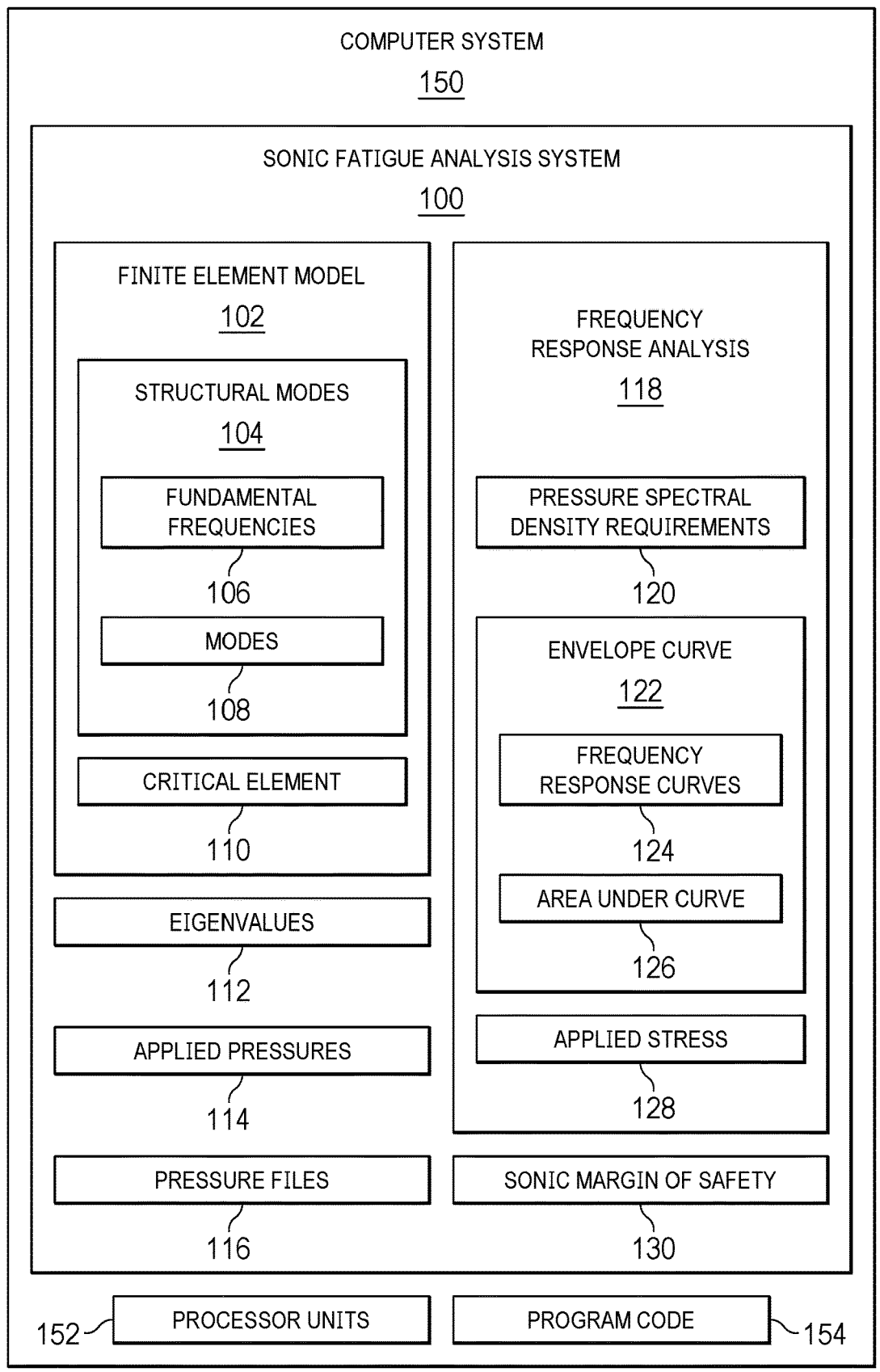
FIG. 1 depicts a block diagram of a sonic fatigue analysis system in accordance with an illustrative embodiment.

FIG. 1 depicts a block diagram of a sonic fatigue analysis system in accordance with an illustrative embodiment. Sonic fatigue analysis system 100 builds a finite element model (FEM) 102 of a structure such as a panel. FEM 102 is an industry standard development of models used to evaluate aerospace structures. FEMs include features such as materials used, part thicknesses, and connection points to supporting structures.

Sonic fatigue analysis system 100 uses FEM 102 to determine a number of structural vibration modes 104 of the structure. This analysis reveals the fundamental frequencies 106 and modes 108 for the structure, which refers to the frequencies and shapes that the structure wants to take assume in response to mechanical excitation. From the FEM 102, sonic fatigue analysis system 100 is able to calculate eigenvalues representing the fundamental frequencies 106 and modes 108 of the structure.

Applied pressures 114 in the form of high frequency pressure waves are applied to FEM according to the structure's modes. Applied pressures 114 are used in order to determine when the structure will crack. This process may be done by applying dynamic pressure waves. Sonic fatigue analysis system 100 determines how the structure wants to deflect according to its modes 108 and then creates a pressure wave to match that shape.

The sonic fatigue analysis system 100 maps applied pressures 114 to eigenvalues 112. The eigenvalue normal vector components are extracted from the modal analysis and scaled to pressure files 116 for all modes of interest.

Frequency response analysis 118 is performed using the applied pressure 114 to predict the stresses in the structure. Because the applied pressures 114 are aligned with the structure's modes 108 and fundamental frequencies 106, the stresses produced from the frequency response analysis 118 provide a reliable conservative result.

Pressure spectral density (PSD) requirements 120 ($PSI^2$/Hz) established the sonic load environment derived from measured, historical, or program requirements. PSD requirements 120 can be thought of as the intensity of the pressure waves and the frequency at which those pressure waves hit the structure. Depending on where the structure is located on an airplane the intensity of pressure waves can vary.

From the frequency response analysis, sonic fatigue analysis system 100 is able to identify which element of the structure in FEM 102 has the highest stress, which is the critical element 110. Critical structural element 110 represents the part of the structure where a crack is expected to form. Once the critical element 110 identified, sonic fatigue analysis system 100 is able to generate more data about that element.

Frequency response curves 124 are generated for the critical element 110 for each mode of interest. This plot is standard output from Nastran and represents the stress response in the critical element 110 as the frequency of the applied pressure wave increases. When multiple frequency response curves are generated the separate curves can be combined into a single envelope curve 122.

The final crack prediction can be performed by calculating the area 126 under this envelope curve 122 to determine applied stress 128. The area 126 under the envelope curve 122 represents the total stress at the critical element 110 and provides a way to determine cumulated alternating stress using all the frequency response curves 124.

Sonic fatigue analysis system 100 uses the applied stress 128 to calculate a sonic margin of safety 130 according to appropriate fatigue strength values. The sonic margin of safety 130 determines if the stress level in the structure/part is sufficient to meet the program requirements.

Sonic fatigue analysis system 100 can be implemented in software, hardware, firmware, or a combination thereof.

When software is used, the operations performed by sonic fatigue analysis system 100 can be implemented in program code configured to run on hardware, such as a processor unit. When firmware is used, the operations performed by sonic fatigue analysis system 100 can be implemented in program code and data and stored in persistent memory to run on a processor unit. When hardware is employed, the hardware can include circuits that operate to perform the operations in sonic fatigue analysis system 100.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 150 is a physical hardware system and includes one or more data processing systems. When more than one data processing system is present in computer system 150, those data processing systems are in communication with each other using a communications medium. The communications medium can be a network. The data processing systems can be selected from at least one of a computer, a server computer, a tablet computer, or some other suitable data processing system.

As depicted, computer system 150 includes a number of processor units 152 that are capable of executing program code 154 implementing processes in the illustrative examples. As used herein a processor unit in the number of processor units 152 is a hardware device and is comprised of hardware circuits such as those on an integrated circuit that respond and process instructions and program code that operate a computer. When a number of processor units 152 execute program code 154 for a process, the number of processor units 152 is one or more processor units that can be on the same computer or on different computers. In other words, the process can be distributed between processor units on the same or different computers in a computer system. Further, the number of processor units 152 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Figure 2:
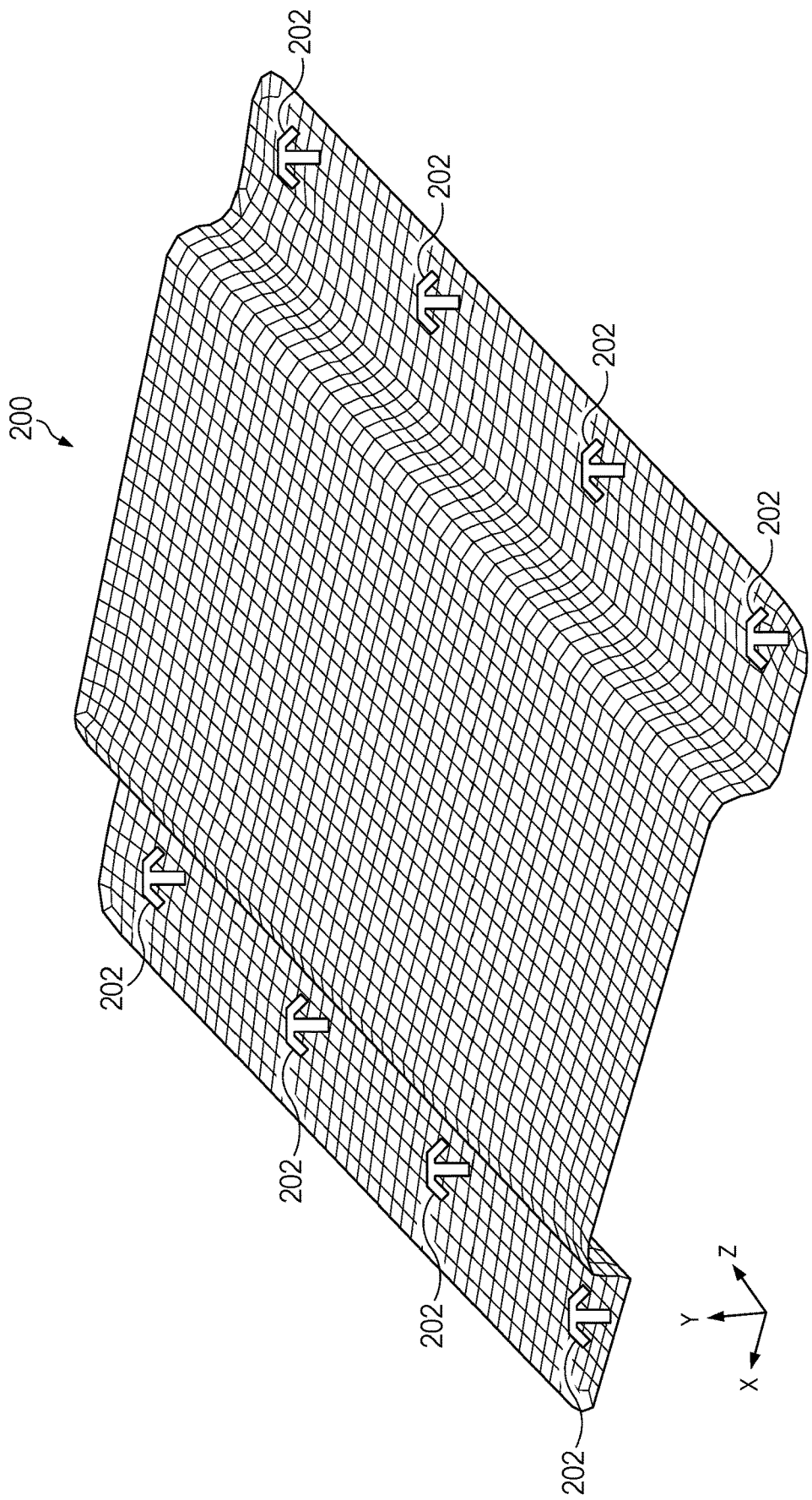
FIG. 2 depicts a diagram illustrating a finite element model of a structure in accordance with an illustrative embodiment.

FIG. 2 depicts a diagram illustrating a finite element model of a structure in accordance with an illustrative embodiment. In the present example, the structure 200 is a small cover that is attached with four protruding head fasteners 202 on each side edge which are assumed to be clamped.

FIG. 3A-3D depicts diagrams illustrating different modes of the structure 200 shown in FIG. 2. In this case to determine the structural response frequency, a simple Nastran Solution 103 (SOL103) analysis may be performed. The model should be constrained with realistic boundary conditions. In the present example, the model is constrained in six degrees of freedom at the edge of the panel. In the present example, the results of the SOL103 run are provided for all modes less than 1250 Hz in order to understand how the structure is responding in the frequency range of interest.

Figure 3A:
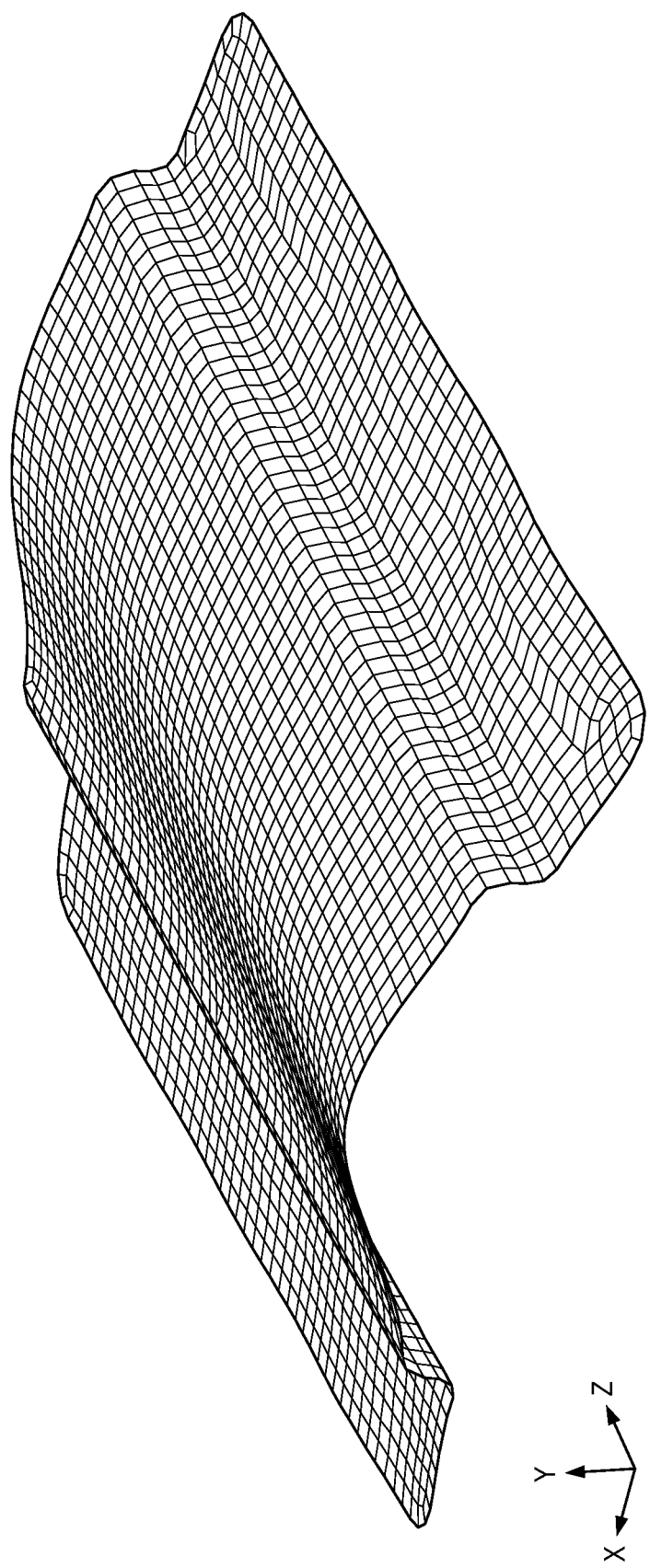
FIG. 3A depicts a diagram of a first mode of the structure at 877 Hz.
Figure 3B:
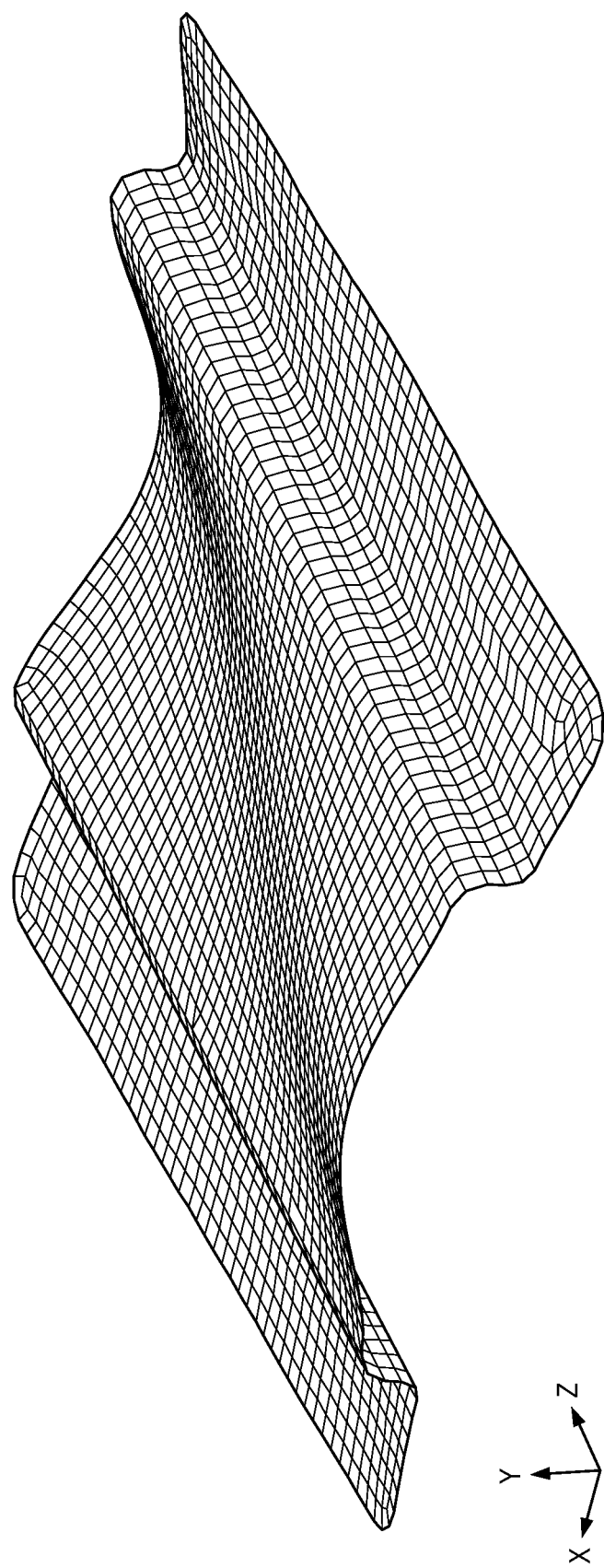
FIG. 3B depicts a diagram of a second mode of the structure at 936 Hz.
Figure 3C:
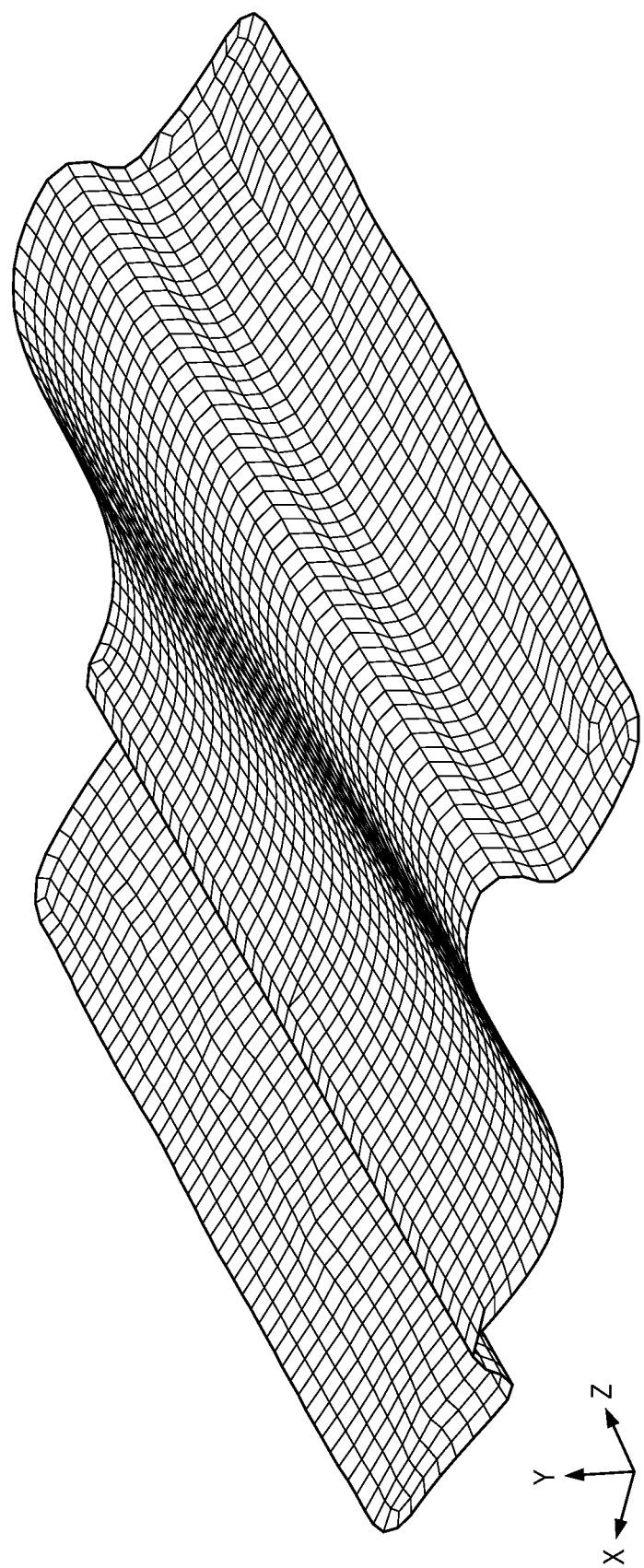
FIG. 3C depicts a diagram of a third mode of the structure at 1006 Hz.
Figure 3D:
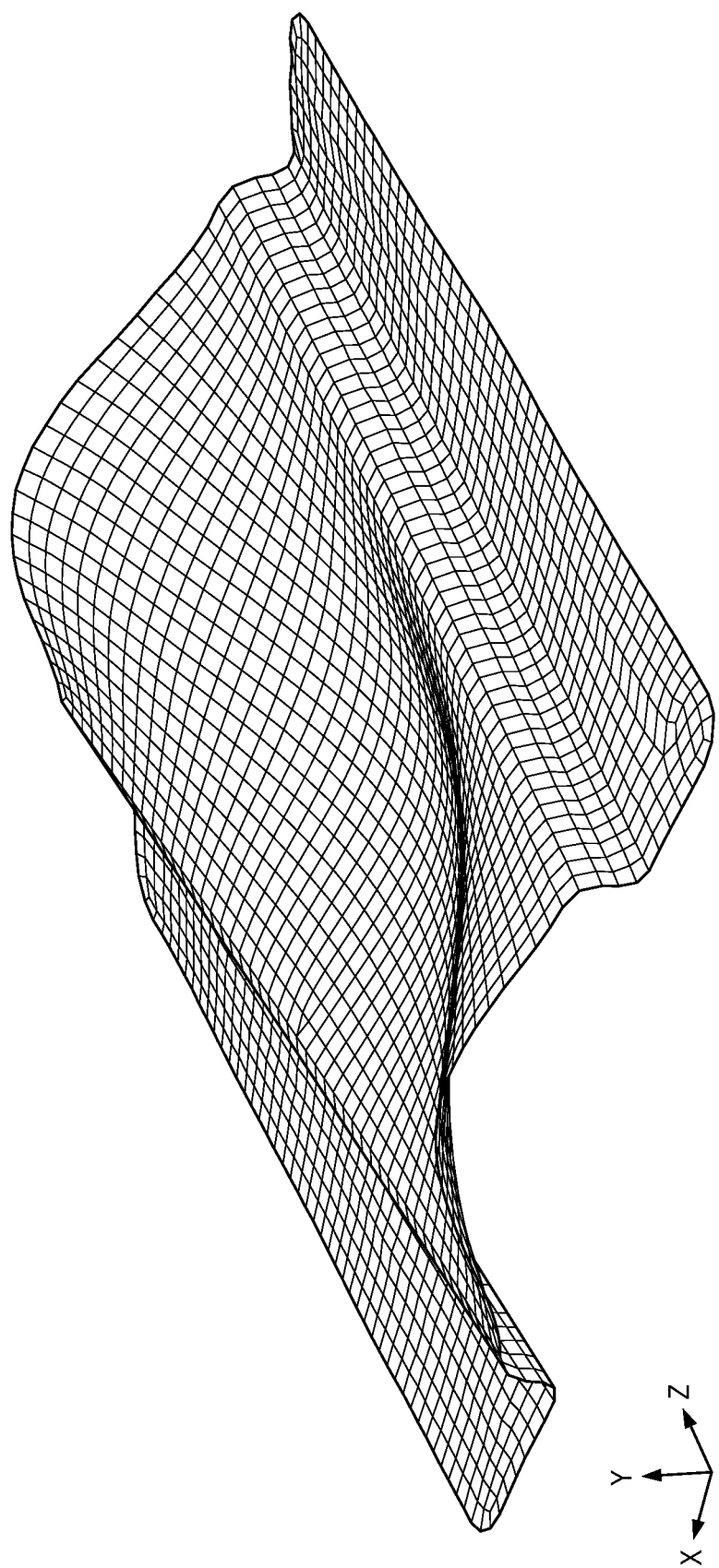
FIG. 3D depicts a diagram of a fourth mode of the structure at 1240 Hz.

FIG. 3A depicts a diagram of a first mode of the structure 200 at 877 Hz. FIG. 3B depicts a diagram of a second mode of the structure 200 at 936 Hz. FIG. 3C depicts a diagram of a third mode of the structure 200 at 1006 Hz. FIG. 3D depicts a diagram of a fourth mode of the structure 200 at 1240 Hz.

Figure 4:
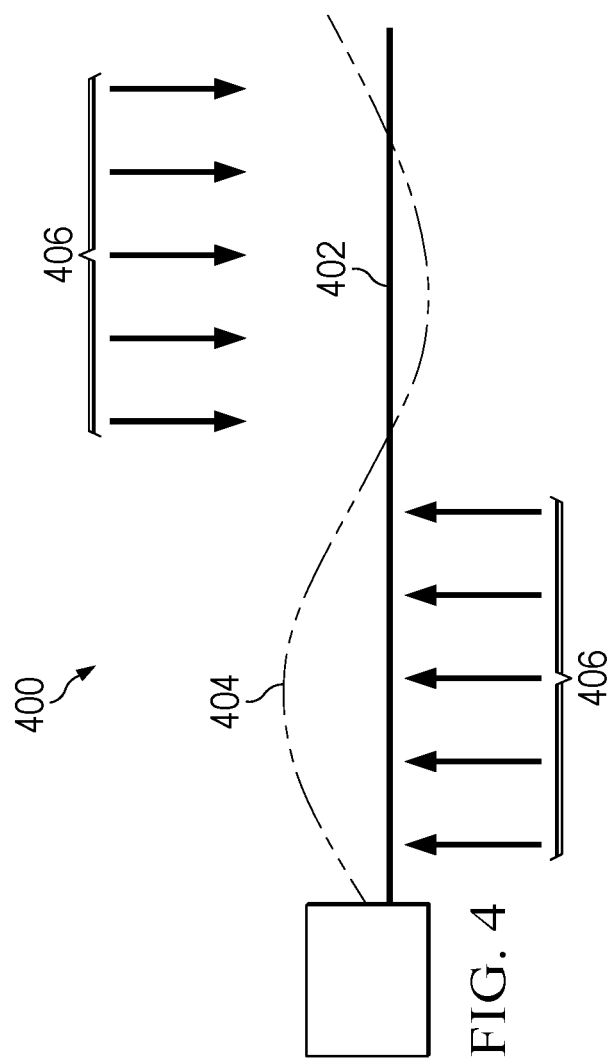
FIG. 4 depicts a diagram illustrating the application of pressure to a FEM according to structural mode in accordance with an illustrative embodiment.

FIG. 4 depicts a diagram illustrating the application of pressure to a FEM according to structural mode in accordance with an illustrative embodiment.

For ease of illustration, the example shown in FIG. 4 is a simplified cantilever beam 400 subject to a unit pressure load representing wave 404.

Figure 5:
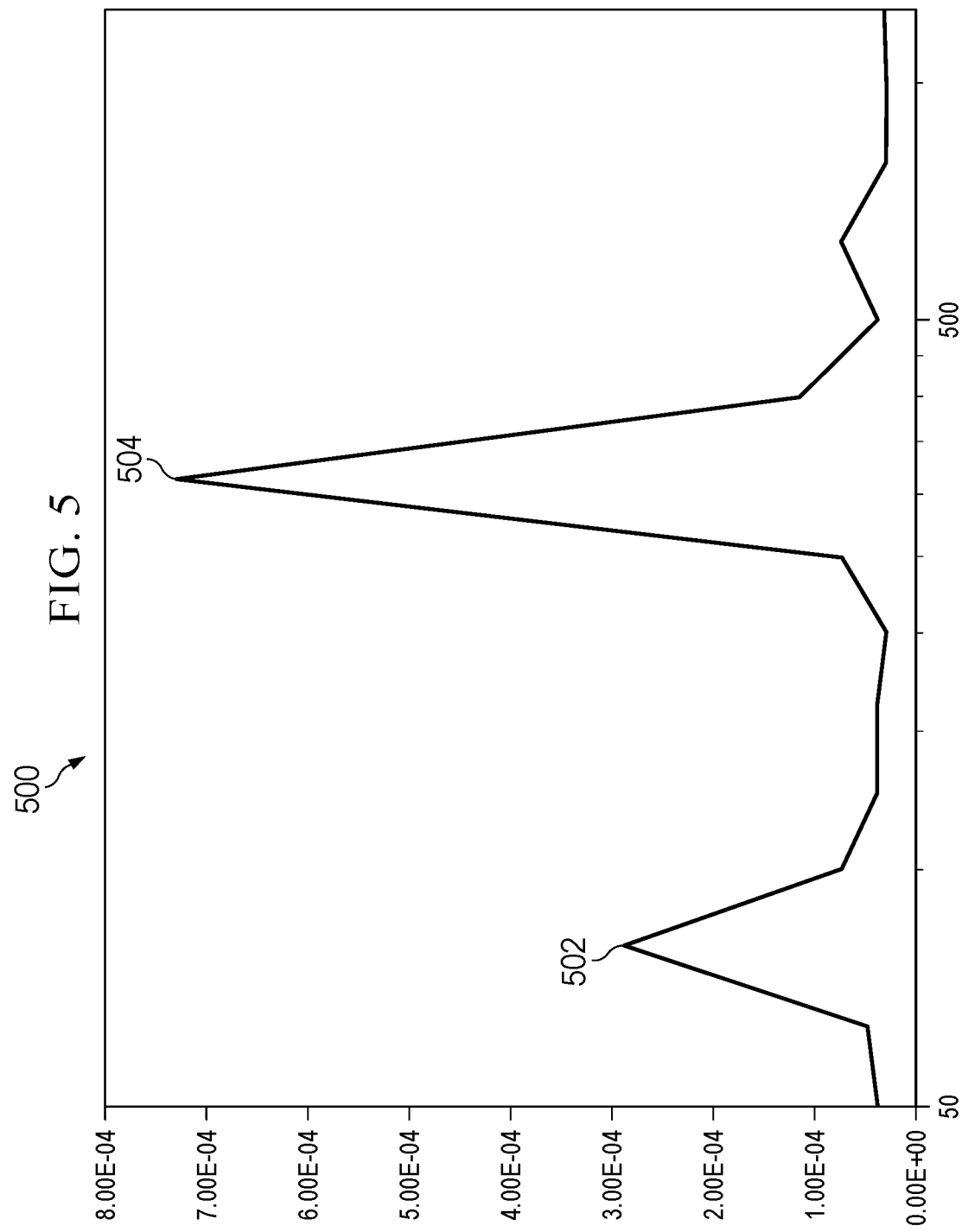
FIG. 5 depicts a graph illustrating the PSD curve of an example sonic environment in accordance with an illustrative embodiment.

FIG. 5 depicts a graph illustrating the PSD curve of an example sonic environment in accordance with an illustrative embodiment. Applying the example of graph 500 to beam 400 in FIG. 4, the arrows 406 can be scaled up or down to match the actual intensity required for the given PSD requirements.

Figure 6:
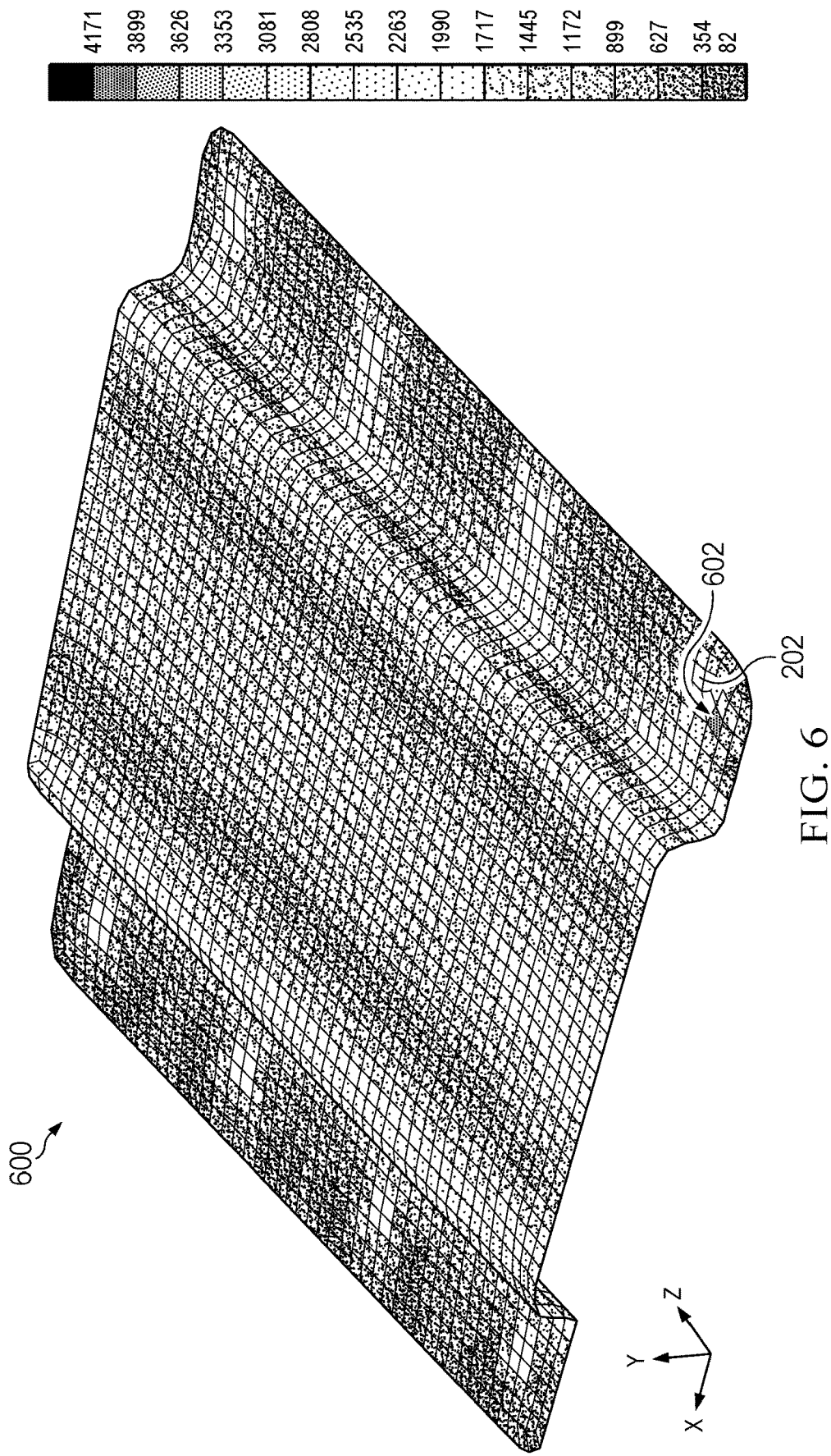
FIG. 6 depicts a diagram illustrating a plot of stress analysis over the structure in accordance with an illustrative embodiment.

FIG. 6 depicts a diagram illustrating a plot of applied stress over the structure in accordance with an illustrative embodiment. After the pressures have been created that match the mode shapes of the structure 200, frequency response analysis can be used to predict the stresses in the structure, represented by fringe plot 600.

As shown in the present example, the critical element 602 with the highest stress corresponds with the location of a head fastener 202. Further investigation is performed by plotting the stress response of the critical element 602 shown in FIG. 7.

Figure 7:
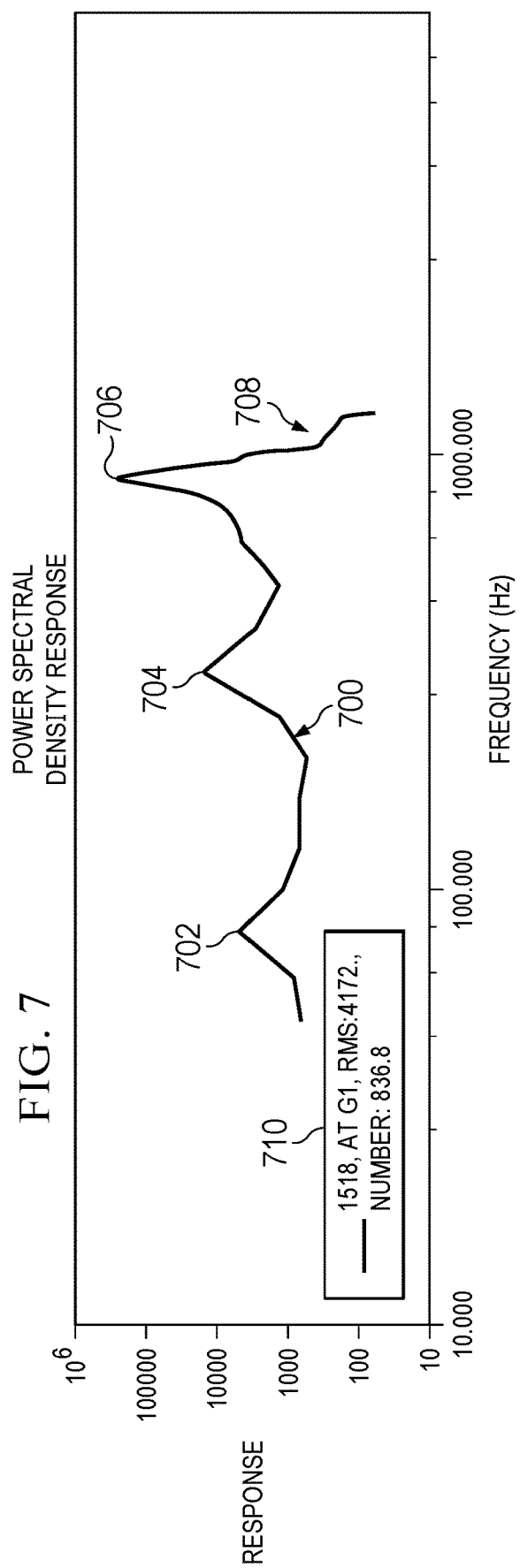
FIG. 7 depicts a graph illustrating a plot of the frequency response function for the critical element in accordance with an illustrative embodiment.

FIG. 7 depicts a graph illustrating a plot of the frequency response function for the critical element 602 in accordance with an illustrative embodiment. In the present example, the first peak 702 correlates to peak 502 shown in FIG. 5 at 80 Hz. This peak is not driven by a structural resonance. Peak 704 corresponds to the peak 504 shown in FIG. 5 at 315 Hz. This peak is not driven by a structural resonance. Peak 706 corresponds to the first mode of the structure and is driven by the fundamental mode of the structure at 877 Hz. At location 708 it is noteworthy that modes 2, 3, and 4 shown in FIGS. 3B, 3C, and 3D, respectively, do not appear to have much impact on the overall stress response.

The root mean square (RMS) von Mises stress on critical element 602 corresponds to the area under curve 700. In the present example, result 710 shows the RMS stress to be 4.1 ksi, which matches the fringe plot 600 in FIG. 6.

Figure 8:
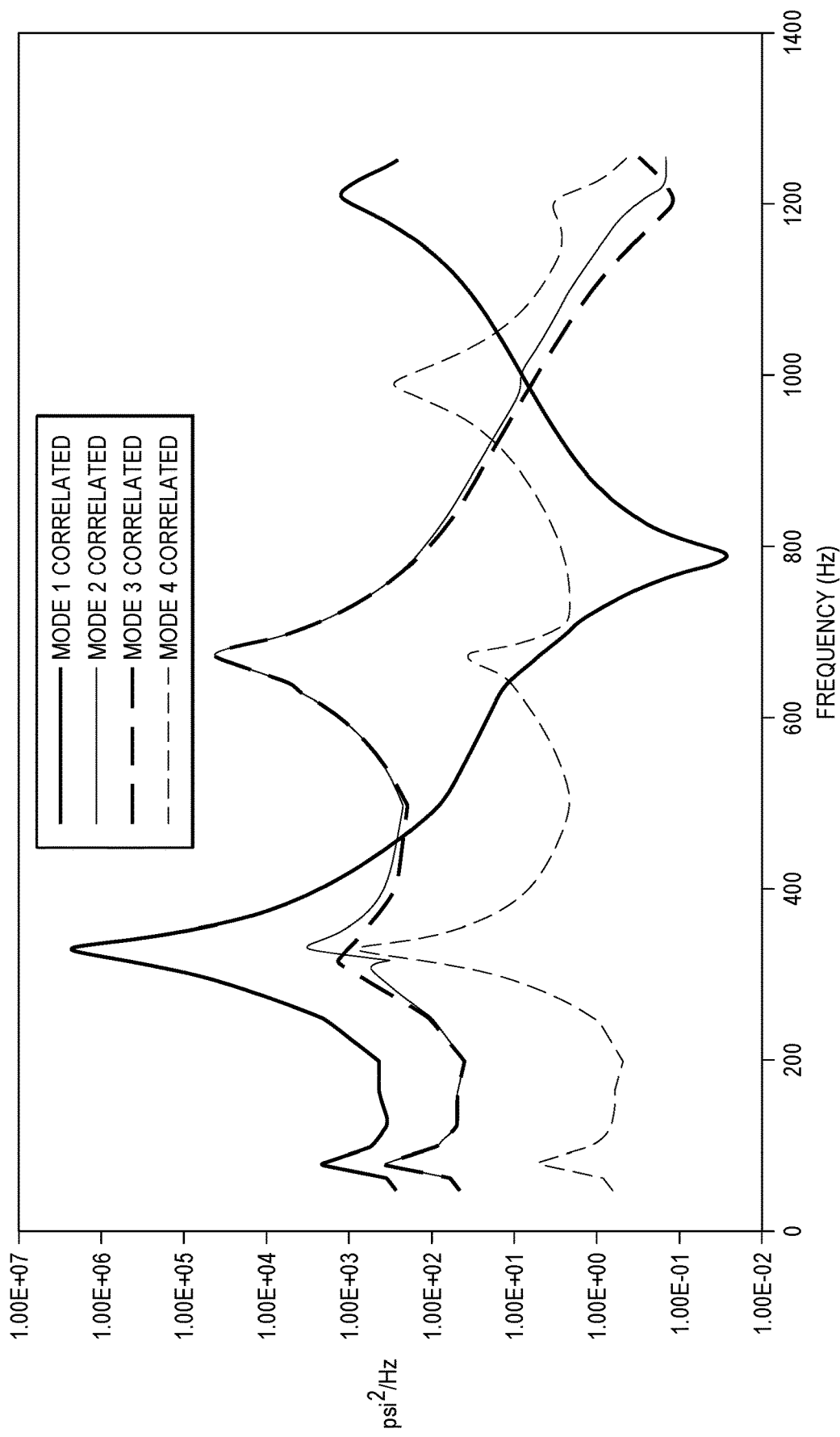
FIG. 8 depicts a graph illustrating multiple frequency response curves for the critical finite element for different modes subject to the applied loading PSD in accordance with an illustrative embodiment.

FIG. 8 depicts a graph illustrating multiple frequency response curves for different modes in accordance with an illustrative embodiment. FIG. 8 represents results from a different critical part analysis than that of FIG. 7. In the present example, the frequency response curves for four modes are superimposed on top of each other. These curves can be enveloped into a single curve shown in FIG. 9.

Figure 9:
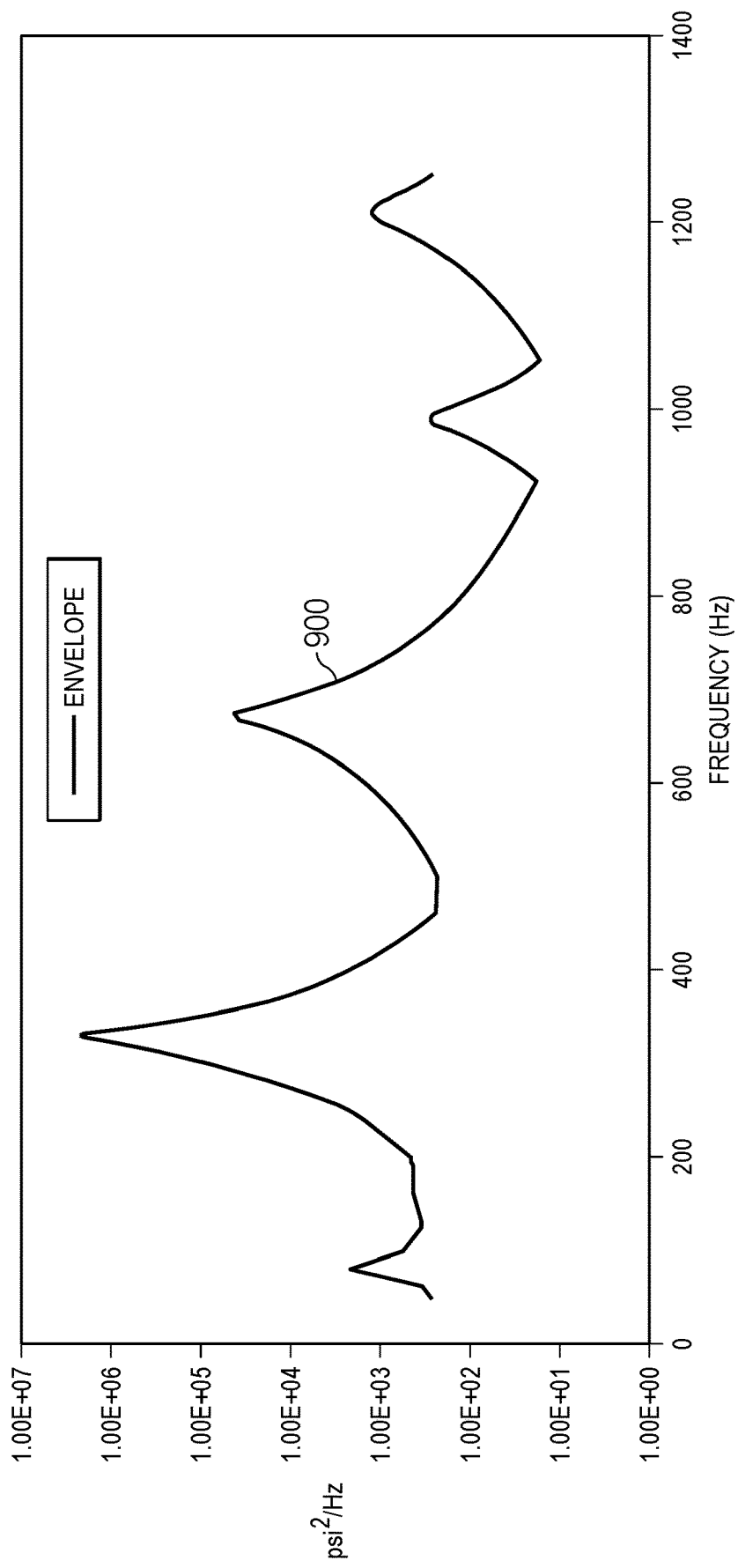
FIG. 9 depicts a graph illustrating a frequency response envelope curve in accordance with an illustrative embodiment.

FIG. 9 depicts a graph illustrating a frequency response envelope curve in accordance with an illustrative embodiment. The area under the enveloping curve 900 is integrated to calculate a new RMS stress.

Figure 10:
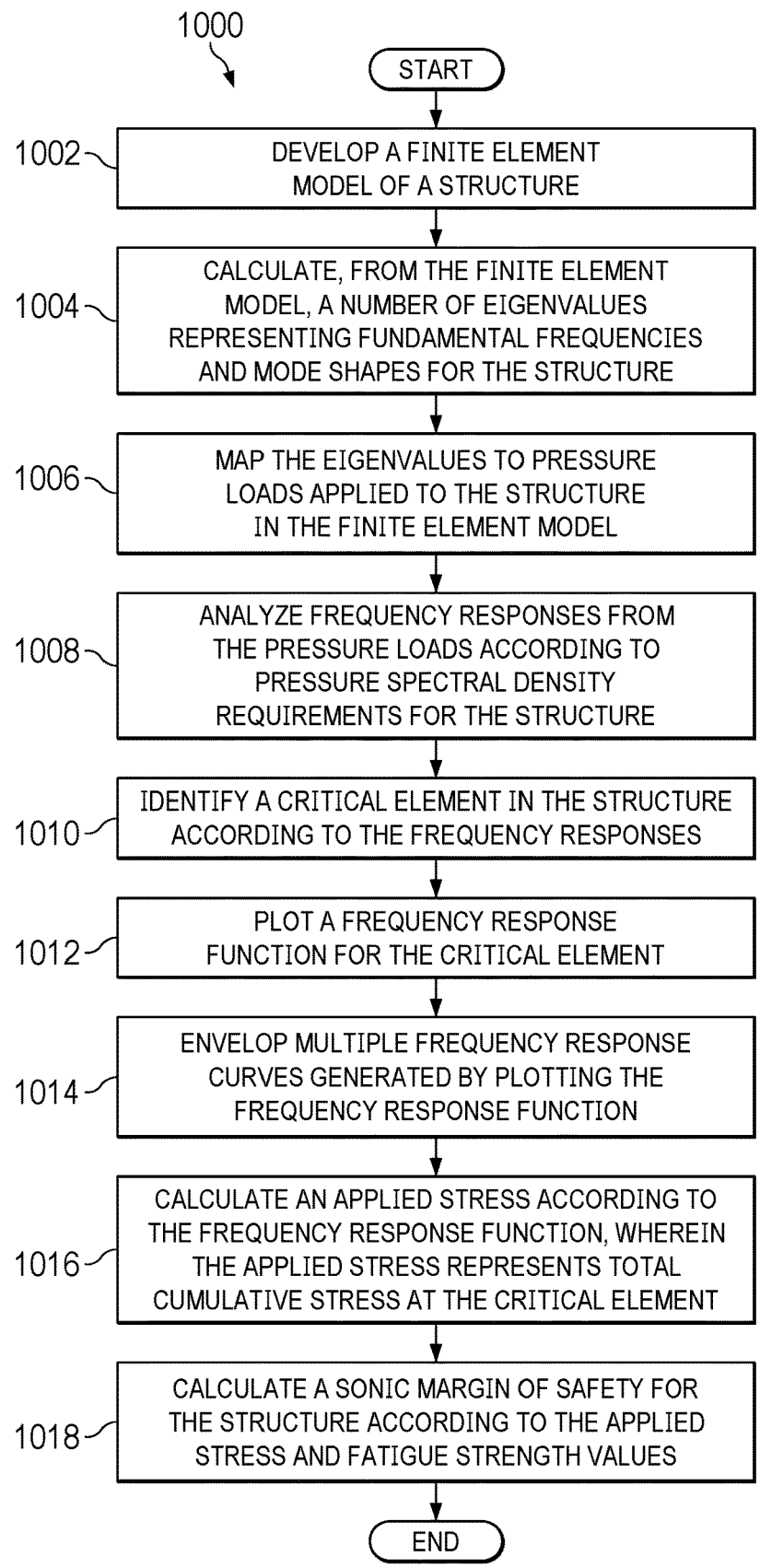
FIG. 10 depicts a flowchart illustrating a process for sonic fatigue analysis in accordance with an illustrative embodiment.

FIG. 10 depicts a flowchart illustrating a process for sonic fatigue analysis in accordance with an illustrative embodiment. The process in FIG. 10 can be implemented in hardware, software, or both. When implemented in software, the process can take the form of program code that is run by one of more processor units located in one or more hardware devices in one or more computer systems. For example, the process can be implemented in sonic fatigue analysis system 100 in computer system 150 in FIG. 1.

Process 1000 begins by developing a finite element model of a structure (operation 1002) and calculating, from the finite element model, a number of eigenvalues representing fundamental frequencies and mode shapes for the structure (operation 1004).

Process 1000 then maps the eigenvalues to pressure loads applied to the structure in the finite element model (operation 1006). The pressure loads are applied as a function of frequency.

Process 1000 analyze frequency responses from the pressure loads according to pressure spectral density requirements for the structure (operation 1008). The frequency stress responses may be analyzed according to a random vibration function. From this analysis, process 1000 identifies a critical element in the structure according to the frequency responses (operation 1010).

Process 1000 plots a frequency response function for the critical element (operation 1012) and may envelop multiple frequency response curves generated by plotting the frequency response function (operation 1014).

Process 1000 calculates an applied stress according to the frequency response function, wherein the applied stress represents total cumulative stress at the critical element (operation 1016). The applied stress comprises alternating stress. The applied stress may be calculated according to an area under a curve produced by enveloping the frequency response curves. Process 1000 then calculates a sonic margin of safety for the structure according to the applied stress and fatigue strength values (operation 1018). Process 1000 ends thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 11:
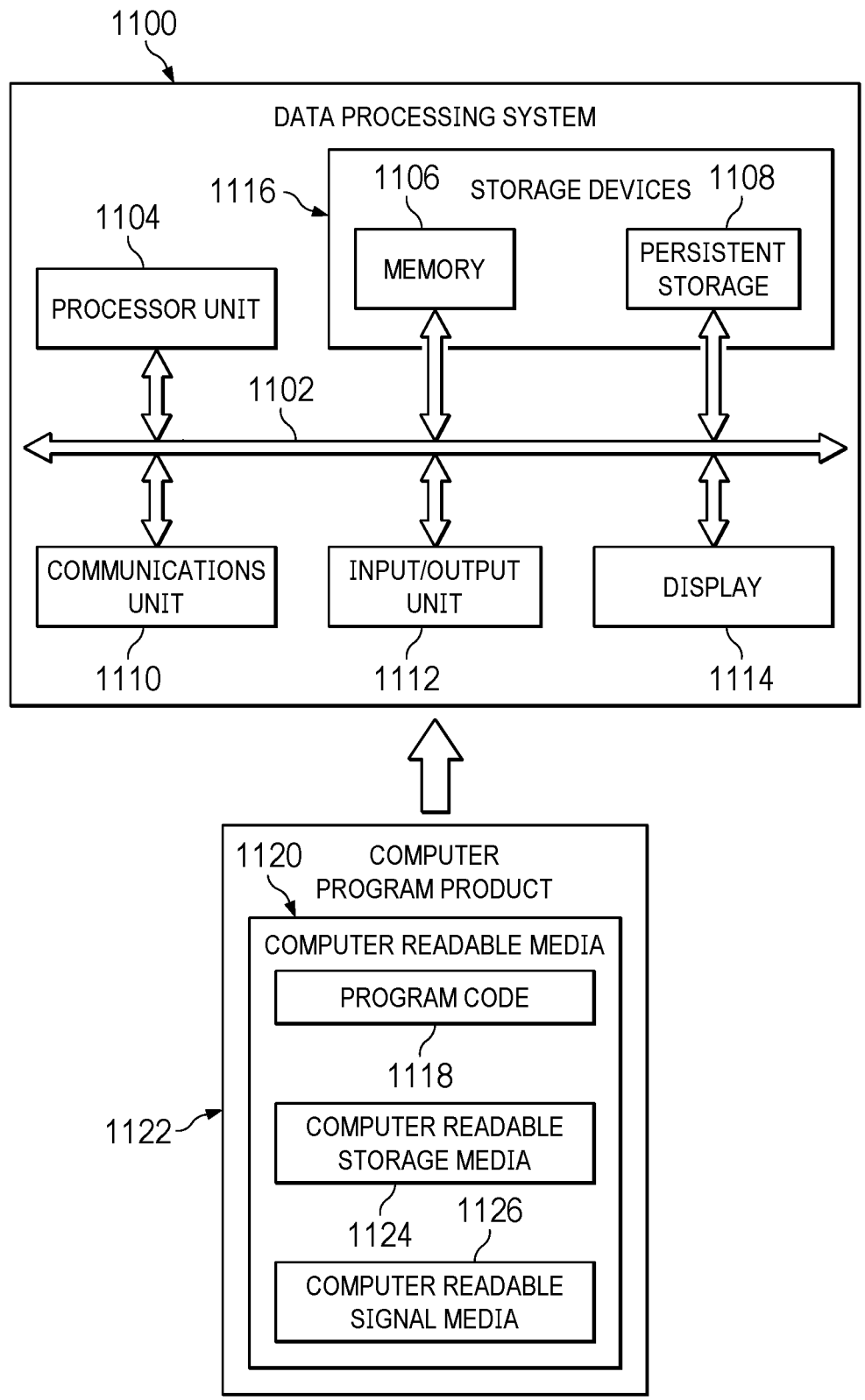
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 may be used to implement computer system 150 in FIG. 1. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that may be loaded into memory 1106. Processor unit 1104 may be a number of processors, a multi-processor core, or some other type of processor, depending on the particular implementation. In an embodiment, processor unit 1104 comprises one or more conventional general-purpose central processing units (CPUs). In an alternate embodiment, processor unit 1104 comprises one or more graphical processing units (CPUs).

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108. Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer-usable program code, or computer-readable program code that may be read and executed by a processor in processor unit 1104. The program code in the different embodiments may be embodied on different physical or computer-readable storage media, such as memory 1106 or persistent storage 1108.

Program code 1118 is located in a functional form on computer-readable media 1120 that is selectively removable and may be loaded onto or transferred to data processing system 1100 for execution by processor unit 1104. Program code 1118 and computer-readable media 1120 form computer program product 1122 in these illustrative examples.

In one example, computer-readable media 1120 may be computer-readable storage media 1124 or computer-readable signal media 1126.

In these illustrative examples, computer-readable-storage media 1124 is a physical or tangible storage device used to store program code 1118 rather than a medium that propagates or transmits program code 1118. Computer-readable storage media 1124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1118 may be transferred to data processing system 1100 using computer-readable signal media 1126. Computer-readable signal media 1126 may be, for example, a propagated data signal containing program code 1118. For example, computer-readable signal media 1126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code 1118.

Figure 12:
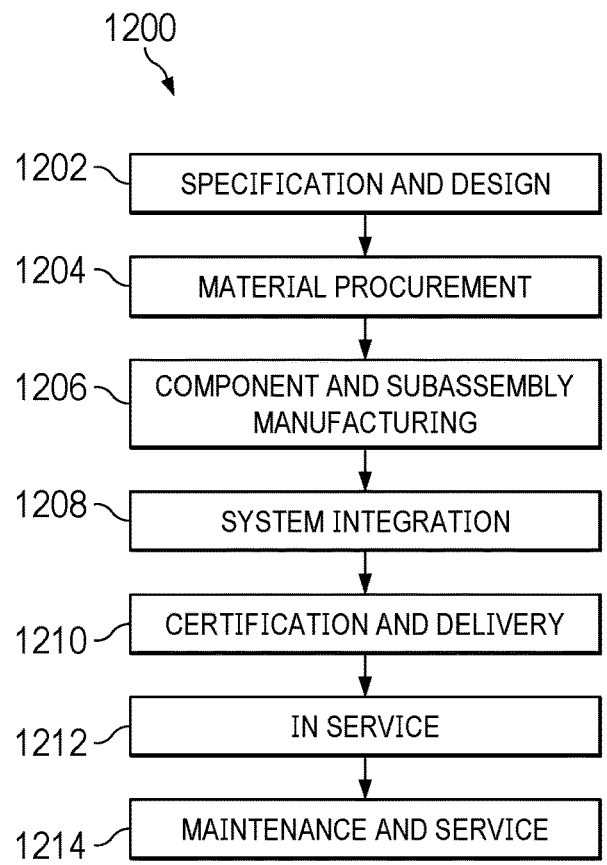
FIG. 12 is an illustration of an aircraft manufacturing and service method in accordance with an illustrative embodiment.
Figure 13:
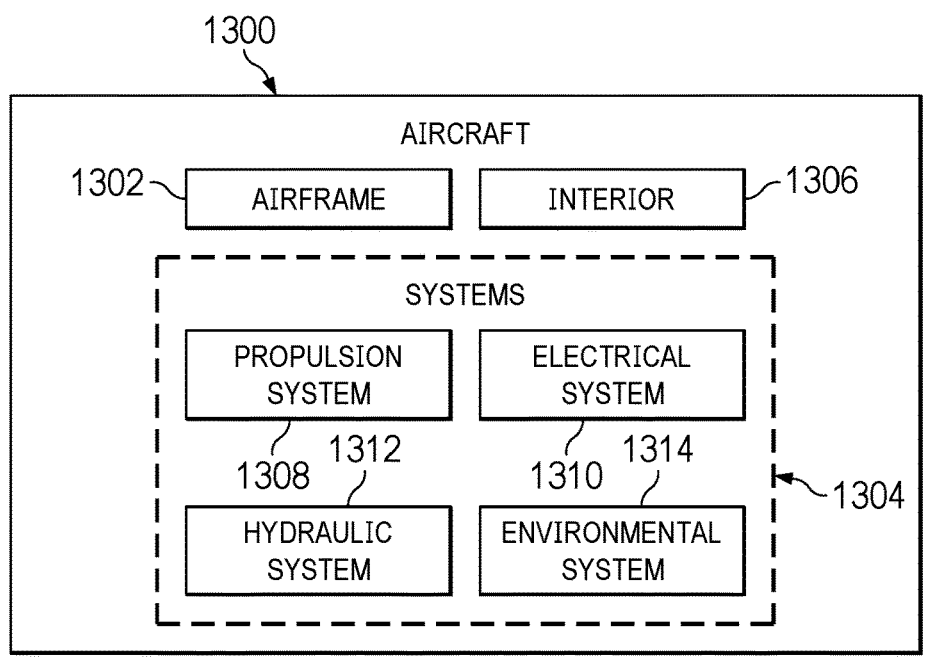
FIG. 13 is an illustration of a block diagram of an aircraft in which an illustrative embodiment may be implemented.

Illustrative embodiments of the disclosure may be described in the context of aircraft manufacturing and service method 1200 as shown in FIG. 12 and aircraft 1300 as shown in FIG. 13. Turning first to FIG. 12, an illustration of an aircraft manufacturing and service method is depicted in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 in FIG. 13 takes place. Thereafter, aircraft 1300 in FIG. 13 can go through certification and delivery 1210 in order to be placed in service 1212. While in service 1212 by a customer, aircraft 1300 in FIG. 13 is scheduled for routine maintenance and service 1214, which may include modification, reconfiguration, refurbishment, and other maintenance or service.

Each of the processes of aircraft manufacturing and service method 1200 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of an aircraft is depicted in which an illustrative embodiment may be implemented. In this example, aircraft 1300 is produced by aircraft manufacturing and service method 1200 in FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1200 in FIG. 12.

In one illustrative example, components or subassemblies produced in component and subassembly manufacturing 1206 in FIG. 12 can be fabricated or manufactured in a manner similar to components or subassemblies produced while aircraft 1300 is in service 1212 in FIG. 12. As yet another example, one or more apparatus embodiments, method embodiments, or a combination thereof can be utilized during production stages, such as component and subassembly manufacturing 1206 and system integration 1208 in FIG. 12. One or more apparatus embodiments, method embodiments, or a combination thereof may be utilized while aircraft 1300 is in service 1212, during maintenance and service 1214 in FIG. 12, or both. The use of a number of the different illustrative embodiments may substantially expedite the assembly of aircraft 1300, reduce the cost of aircraft 1300, or both expedite the assembly of aircraft 1300 and reduce the cost of aircraft 1300.

Figure 14:
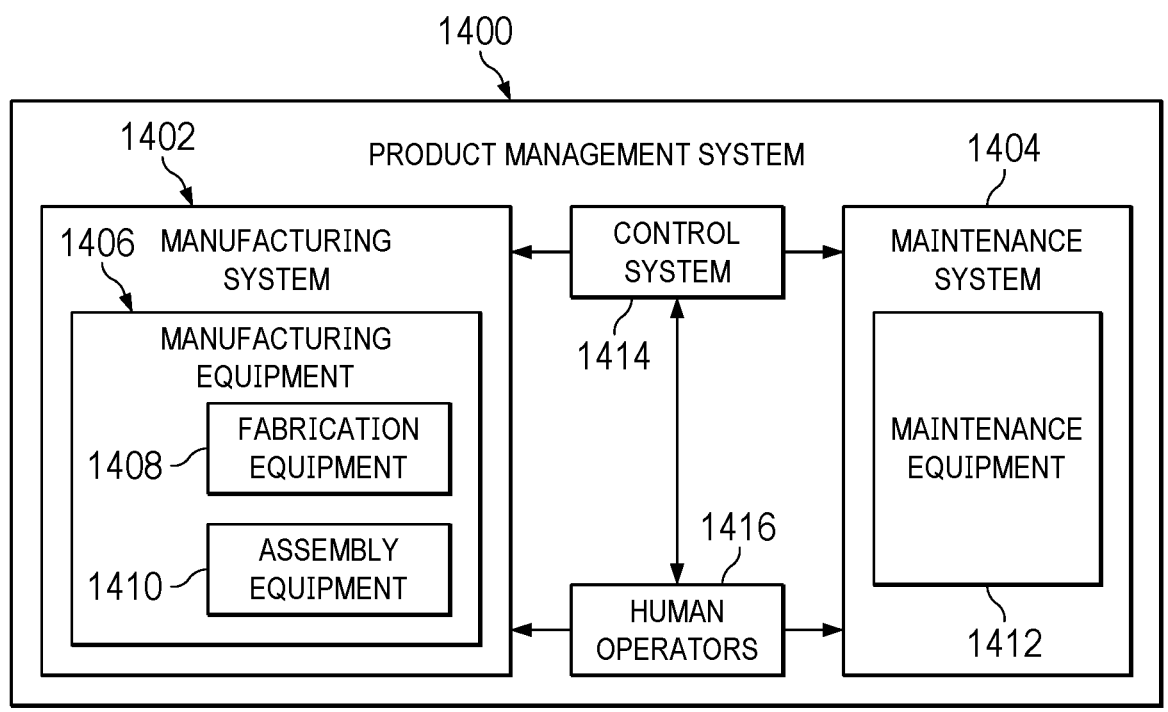
FIG. 14 is an illustration of a block diagram of a product management system is depicted in accordance with an illustrative embodiment.

Turning now to FIG. 14, an illustration of a block diagram of a product management system is depicted in accordance with an illustrative embodiment. Product management system 1400 is a physical hardware system. In this illustrative example, product management system 1400 includes at least one of manufacturing system 1402 or maintenance system 1404.

Manufacturing system 1402 is configured to manufacture products, such as aircraft 1300 in FIG. 13. As depicted, manufacturing system 1402 includes manufacturing equipment 1406. Manufacturing equipment 1406 includes at least one of fabrication equipment 1408 or assembly equipment 1410.

Fabrication equipment 1408 is equipment that used to fabricate components for parts used to form aircraft 1300 in FIG. 13. For example, fabrication equipment 1408 can include machines and tools. These machines and tools can be at least one of a drill, a hydraulic press, a furnace, an autoclave, a mold, a composite tape laying machine, an automated fiber placement (AFP) machine, a vacuum system, a robotic pick and place system, a flatbed cutting machine, a laser cutter, a computer numerical control (CNC) cutting machine, a lathe, or other suitable types of equipment. Fabrication equipment 1408 can be used to fabricate at least one of metal parts, composite parts, semiconductors, circuits, fasteners, ribs, skin panels, spars, antennas, or other suitable types of parts.

Assembly equipment 1410 is equipment used to assemble parts to form aircraft 1300 in FIG. 13. In particular, assembly equipment 1410 is used to assemble components and parts to form aircraft 1300 in FIG. 13. Assembly equipment 1410 also can include machines and tools. These machines and tools may be at least one of a robotic arm, a crawler, a faster installation system, a rail-based drilling system, or a robot. Assembly equipment 1410 can be used to assemble parts such as seats, horizontal stabilizers, wings, engines, engine housings, landing gear systems, and other parts for aircraft 1300 in FIG. 13.

In this illustrative example, maintenance system 1404 includes maintenance equipment 1412. Maintenance equipment 1412 can include any equipment needed to perform maintenance on aircraft 1300 in FIG. 13. Maintenance equipment 1412 may include tools for performing different operations on parts on aircraft 1300 in FIG. 13. These operations can include at least one of disassembling parts, refurbishing parts, inspecting parts, reworking parts, manufacturing replacement parts, or other operations for performing maintenance on aircraft 1300 in FIG. 13. These operations can be for routine maintenance, inspections, upgrades, refurbishment, or other types of maintenance operations.

In the illustrative example, maintenance equipment 1412 may include ultrasonic inspection devices, x-ray imaging systems, vision systems, drills, crawlers, and other suitable devices. In some cases, maintenance equipment 1412 can include fabrication equipment 1408, assembly equipment 1410, or both to produce and assemble parts that needed for maintenance.

Product management system 1400 also includes control system 1414. Control system 1414 is a hardware system and may also include software or other types of components. Control system 1414 is configured to control the operation of at least one of manufacturing system 1402 or maintenance system 1404. In particular, control system 1414 can control the operation of at least one of fabrication equipment 1408, assembly equipment 1410, or maintenance equipment 1412.

The hardware in control system 1414 can be implemented using hardware that may include computers, circuits, networks, and other types of equipment. The control may take the form of direct control of manufacturing equipment 1406. For example, robots, computer-controlled machines, and other equipment can be controlled by control system 1414. In other illustrative examples, control system 1414 can manage operations performed by human operators 1416 in manufacturing or performing maintenance on aircraft 1300. For example, control system 1414 can assign tasks, provide instructions, display models, or perform other operations to manage operations performed by human operators 1416. In these illustrative examples, control system 1414 to manage at least one of the manufacturing or maintenance of aircraft 1300 in FIG. 13 to employ a fuel tank protection system within fuel tanks for aircraft 1300. The fuel protection system can be implemented in fuel tanks during manufacturing fuel tanks for adding fuel tanks during maintenance to aircraft 1300.

In the different illustrative examples, human operators 1416 can operate or interact with at least one of manufacturing equipment 1406, maintenance equipment 1412, or control system 1414. This interaction can occur to manufacture aircraft 1300 in FIG. 13.

Of course, product management system 1400 may be configured to manage other products other than aircraft 1300 in FIG. 13. Although product management system 1400 has been described with respect to manufacturing in the aerospace industry, product management system 1400 can be configured to manage products for other industries. For example, product management system 1400 can be configured to manufacture products for the automotive industry as well as any other suitable industries.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implement method for sonic fatigue analysis, the method comprising using a number of processors to perform the operations of:
    developing a finite element model of a structure;
    calculating, from the finite element model, a number of eigenvalues representing fundamental frequencies and mode shapes for the structure;
    mapping the eigenvalues to pressure loads applied to the structure in the finite element model;
    analyzing frequency responses from the pressure loads according to pressure spectral density requirements for the structure;
    identifying a critical element in the structure according to the frequency responses;
    plotting a frequency response function for the critical element;
    enveloping multiple frequency response curves generated by plotting the frequency response function; and
    calculating an applied stress according to the frequency response function, wherein the applied stress represents total cumulative stress at the critical element.

2. The method of claim 1, wherein enveloping multiple frequency response curves comprises forming an enveloping curve.

3. The method of claim 2, wherein the applied stress is calculated according to an area under the enveloping curve.

4. The method of claim 1, further comprising calculating a sonic margin of safety for the structure according to the applied stress and fatigue strength values.

5. The method of claim 1, wherein the pressure loads are applied as a function of frequency.

6. The method of claim 1, wherein the frequency responses are analyzed according to a random vibration function.

7. The method of claim 1, wherein the applied stress comprises alternating stress.

8. A system configured to analyze sonic fatigue, wherein the system comprises:
    a storage device configured to store program instructions; and one or more processors operably connected to the storage device and configured to execute the program instructions to cause the system to:
  develop a finite element model of a structure;
  calculate, from the finite element model, a number of eigenvalues representing fundamental frequencies and mode shapes for the structure;
  map the number of eigenvalues to pressure loads applied to the structure in the finite element model;
  analyze frequency responses from the pressure loads according to pressure spectral density requirements for the structure;
  identify a critical element in the structure according to the frequency responses;
  plot a frequency response function for the critical element;
  to envelop multiple frequency response curves generated by plotting the frequency response function; and
  calculate an applied stress according to the frequency response function, wherein the applied stress represents total cumulative stress at the critical element.

9. The system of claim 8, wherein the processors further execute instructions to form an enveloping curve.

10. The system of claim 9, wherein the applied stress is calculated according to an area under the enveloping curve.

11. The system of claim 8, wherein the processors are further configured to execute instructions to calculate a sonic margin of safety for the structure according to the applied stress and fatigue strength values.

12. The system of claim 8, wherein the pressure loads are applied as a function of frequency.

13. The system of claim 8, wherein the frequency responses are analyzed according to a random vibration function.

14. The system of claim 8, wherein the applied stress comprises alternating stress.

15. A computer program product configured to analyze sonic fatigue, wherein the computer program product comprises:

a computer-readable storage medium that comprises program instructions embodied thereon and configured to:
  develop a finite element model of a structure;
  calculate, from the finite element model, a number of eigenvalues representing fundamental frequencies and mode shapes for the structure;
  map the number of eigenvalues to pressure loads applied to the structure in the finite element model;
  analyze frequency responses from the pressure loads according to pressure spectral density requirements for the structure;
  identify a critical element in the structure according to the frequency responses;
  plot a frequency response function for the critical element; to envelop multiple frequency response curves generated by plotting the frequency response function;
  to envelop multiple frequency response curves generated by plotting the frequency response function; and
  calculate an applied stress according to the frequency response function, wherein the applied stress represents total cumulative stress at the critical element.

16. The computer program product of claim 15, further comprising instructions configured to form an enveloping curve.

17. The computer program product of claim 16, wherein the applied stress is calculated according to an area under the enveloping curve.

18. The computer program product of claim 15, further comprising instructions configured to calculate a sonic margin of safety for the structure based upon the applied stress and fatigue strength values.

19. The computer program product of claim 15, wherein the pressure loads are applied as a function of frequency.

20. The computer program product of claim 15, wherein the frequency responses are analyzed according to a random vibration function.

21. The computer program product of claim 15, wherein the applied stress comprises alternating stress.

* * * * *